Oct. 11, 1932.                    E. ROBERTS                      1,882,037
                         BRAKE FOR CENTRIFUGAL MACHINES
                         Filed April 23, 1929      2 Sheets-Sheet 1
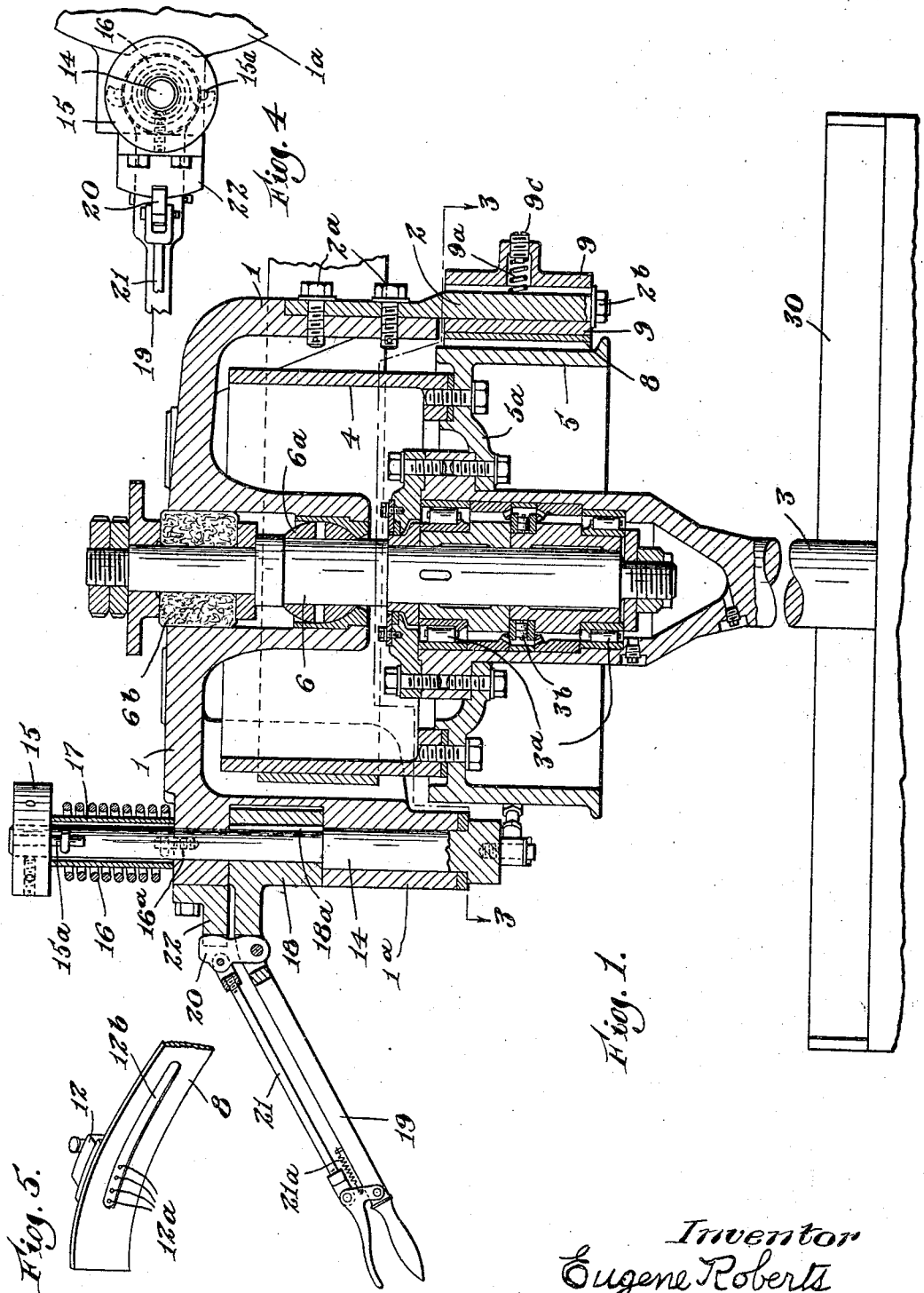
Inventor
Eugene Roberts
by
Geo. N. Goddard Attorney Oct. 11, 1932.  E. ROBERTS  1,882,037
BRAKE FOR CENTRIFUGAL MACHINES
Filed April 23, 1929  2 Sheets-Sheet 2
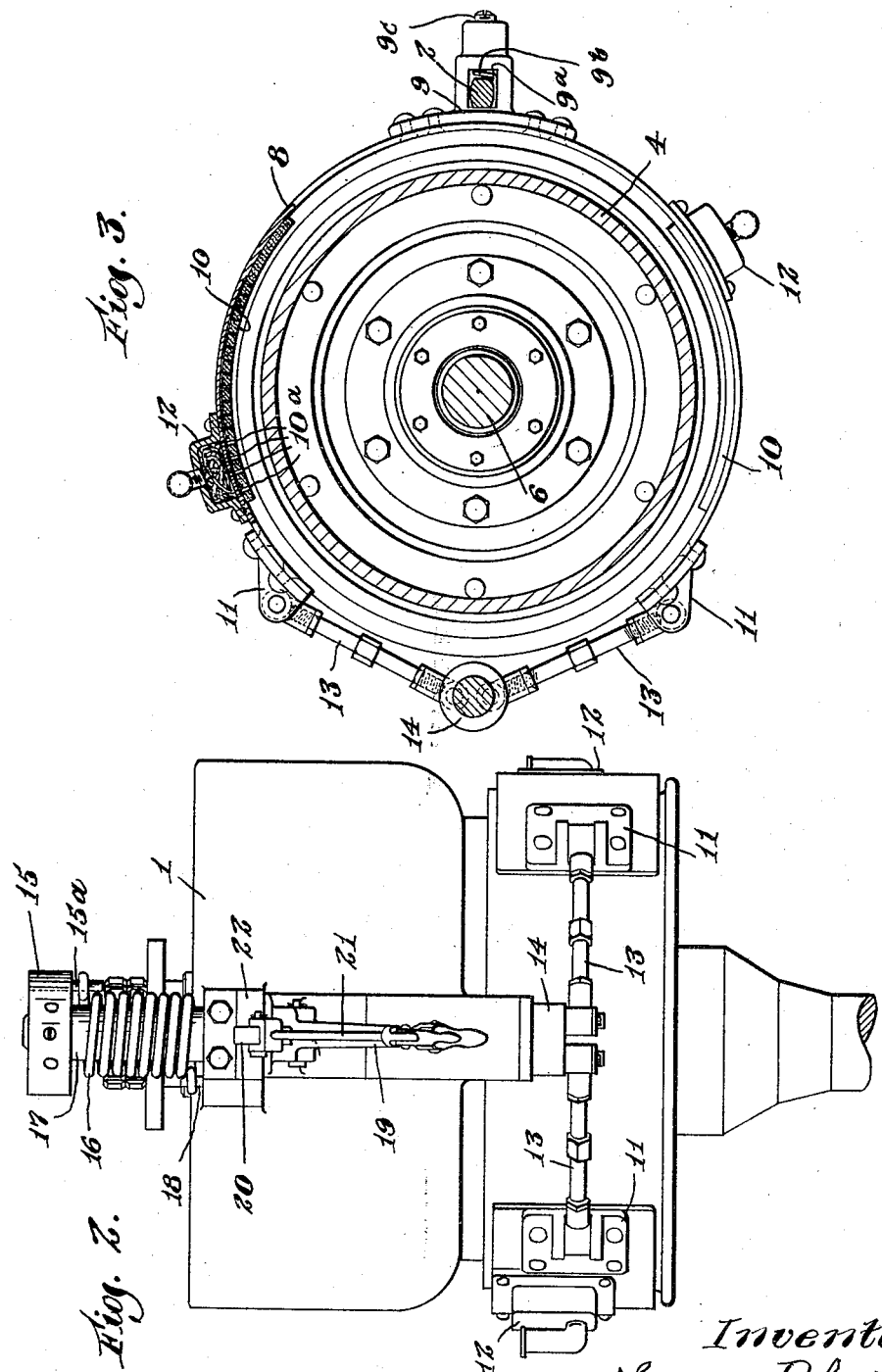
Inventor
Eugene Roberts
by
Geo. N. Goddard, Attorney Patented Oct. 11, 1932

1,882,037

UNITED STATES PATENT OFFICE

EUGENE ROBERTS, OF HASTINGS, NEW YORK, ASSIGNOR TO THE WESTERN STATES MACHINE COMPANY, OF SALT LAKE CITY, UTAH, A CORPORATION OF UTAH

BRAKE FOR CENTRIFUGAL MACHINES

Application filed April 23, 1929. Serial No. 357,502.

This invention relates to brake mechanism for centrifugal machines of the suspended gyratory type and is intended to provide a simple and efficient construction and arrangement for effecting the stopping of the centrifugal within any desired predetermined period of time.

Generally speaking, the invention comprises, in combination with a suspended gyratory centrifugal having a brake pulley adjacent to its suspension point, an external brake band whose fulcral portion is movable inwardly toward the brake pulley by the brake setting and contracting mechanism against outward yielding resistance, the brake setting mechanism embracing an actuating spring having tensioning adjustment and manually operable means for releasing the brake against the brake actuating spring, and means for releasably latching the brake actuating mechanism against actuation by the spring. Arrangements are also provided for effectively maintaining the friction surfaces of the brake shoes in proper condition to apply uniform braking friction against the brake pulley when the brake is set. These and other features of the invention will be particularly described in the following specification and will be defined in the claims hereto annexed.

In the accompanying drawings I have illustrated a construction and arrangement of brake mechanism in association with a suspended gyratory centrifugal which embodies the principles of this invention, in which drawings Fig. 1 is a side elevation in verical central section showing the upper part of the centrifugal suspended in its supporting hanger in association with the brake actuating mechanism.

Fig. 2 is a front view in elevation of the same centrifugal and brake mechanism.

Fig. 3 is a horizontal section on the plane of broken line 3—3 shown in Fig. 1.

Fig. 4 is a detail view showing in plan the actuating spindle and its lever and locking latch.

Fig. 5 is a detail showing in perspective the forward end portion of the brake band with the ducts or passages for applying dressing to the brake pad carried thereby.

Heretofore, it has been customary in sugar centrifugal practice for the operator to apply the brake by hand, usually through brake-expanding toggle levers which, when moved to dead center position, forced the brake shoes against the interior of the brake pulley and held them positively in that position with the consequence that the slightest wear on the brake pads relaxed the effective pressure or friction of the brake against the pulley. The present invention seeks to maintain a uniform action of the brake by providing an arrangement and construction by which a spring actuated spindle is held under predetermined but variable tension for contracting an external brake upon the brake pulley that is secured to the gyratory shaft of the centrifugal. Furthermore, uniform friction is maintained by keeping the brake pads in proper condition to exert their maximum friction by arranging at the advance or forward end, rotatably speaking, of each brake pad a reservoir or grease cup provided with wicking and discharging into distributing ducts, through which the liquid or semiliquid dressing is distributed along the brake pads.

In the practice of the invention, as illustrated in the drawings, a socketed centrifugal suspension hanger 1 of well known type affords a spherical bearing seat for the suspension of a gyratory, non-rotating spindle 6, which spindle has secured to it a suspension ball or head 6ª adapted to be seated in the socket of the hanger to gyrate against a centralizing yielding buffer 6ᵇ, but without rotation. The centrifugal shaft 3, having an enlarged upper end portion, is rotatably supported on the spindle by means of a thrust roller bearing 3ᵇ and radial roller bearings 3ª interposed between suitable race members or rings.

The centrifugal shaft 3, of course, carries at its lower end the centrifugal separator basket 30 and at its upper end has detachably secured a spider 5ª for supporting a cylindrical brake pulley 5 and a cylindrical belt driven pulley 4, the latter being located around and in the plane of the spherical bearing suspension ball.

Extending downward from one side of the hanger is a brake supporting element 2 in the form of a bar detachably bolted to the hanger, as shown at 2ª. This bar is shaped to extend down through a vertical slot or opening in the fulcral block or member 9 of the brake. At its lower end this brake supporting member is provided with a nut and washer, as shown at 2ᵇ, to prevent the fulcral part of the brake from slipping down.

The form of brake shown herein comprises an arcuate band 8, to whose middle or rear portion is secured a fulcral block or member 9 having a vertical passage or opening adapted to receive the brake suspending member 2 and proportioned to allow inward and outward play of the fulcral portion of the brake on its suspending member 2. Normally, when the brake is not in action, a transverse compression spring 9ª, adjustably tensioned by a screw plug 9ᶜ, acts to exert a variable outward thrust on the fulcral portion of the brake, thereby shifting the brake when uncontracting out of contact with the brake pulley and maintaining it out of such contact.

At its forward ends the brake band 8 is secured to ear pieces or blocks 11, in which are pivotally mounted horizontal links 13, whose adjacent ends are pivotally connected to diametrically opposed pins secured to the lower enlarged end of the brake actuating spindle 14 on opposite sides of the central axis thereof. These actuating links are made in threaded parts to facilitate lengthwise adjustment.

The vertical brake actuating spindle or shaft 14 is rotatably mounted in a downward extension 1ª of the fixed hanger 1 and has secured to its upper end a rotatably adjustable spring anchoring nut 15 provided with an off center anchoring pin 15ª adapted to engage and hold the upper hooked end of a helical torsion spring 16. The lower hooked end of the torsion spring is anchored upon an anchoring pin 16ª carried in the fixed hanger 1. A spacing sleeve 17 is interposed between the torsion spring and the spindle and acts to sustain the weight of the spindle against downward displacement through its engagement with the adjustable nut 15.

Splined on the spindle at 18ª is a collar 18 provided with a forwardly projecting arm or lever 19, by which the spindle may be rotated against the tension of the spring to unset or release the brake. A latch 20 is arranged to engage a notch or slot in the forward end of a stop block 22 secured to the front of the hanger. The latch is released by a hand grip or pull 21, which is normally retracted to locking position by the retractile spring 21ª.

The torsion spring 16, due to its fixed anchorage on the hanger and its movable anchorage 15ª connecting it with the brake actuating shaft 14, acts to rotate the shaft 14 and, through the agency of the connecting links 13, contracts the brake band powerfully against the interiorly disposed brake pulley 5.

Preferably the actual braking contact is made through the medium of an arcuate renewable friction pad 10 secured to the inside of the brake band on opposite sides of the pulley.

The brake actuating spring may be set at any desired tension so that it will have a predetermined period of action which will be uniform for the same setting in bringing the centrifugal to rest, thereby making it possible to determine just what the duration of the braking period shall be in the whole cycle of centrifugal machine operation. To maintain the brake pads in uniform frictional condition, I provide means for supplying a liquid, or semi-liquid, dressing to the brake pads. The means shown comprise grease cups or receptacles 12 secured to the outside of the brake band and located at the advance or forward end of each brake pad, considered with reference to the clockwise rotation of the centrifugal. The interior surface of the brake band 8, subtending the brake pad, is provided with a small distributing groove or channel 12ᵇ into which the dressing may seep through the distributing ports or perforations 12ª. Preferably wicking is disposed inside of the main receptacle 12 to avoid too rapid distribution of the dressing.

When the machine is about to be started, the brake is relieved or unset by throwing the lever 19 over until the latch 20 is in position to engage the notch in the stop member 22. This acts to wind up the brake actuating spring under further tension while expanding the brake band and at the same time allows the fulcral or rear portion of the brake to move backward under the thrust of the compression spring 9ª away from contact with the pulley 5, so that by the expansion of the brake it is completely disengaged from the brake pulley. This is the position of the brake shown in the various views.

On the other hand, the mere releasing of the latch 20 allows the brake setting spring 16 to set or contract the brake with the desired degree of pressure upon the periphery of the brake pulley.

By mounting the brake so that both its middle or fulcral portion and its free ends are movable toward and away from the brake pulley, the brake may be arranged somewhat below the center of gyration without disturbing or interferring with the proper action of the centrifugal, because it is free to follow the slight gyratory movement of the pulley to this point without losing its frictional grip on the pulley. The links, in conjunction with the floating or movable fulcral support, provide a three-point suspension for the brake that permits the slight gyration necessary to permit the brake to perfectly accommodate itself to the oscillation of the gyrating brake pulley. And this I believe to be also a new feature in sugar centrifugal practice.

What I claim is:

1. A brake for a gyratory suspended centrifugal embracing in combination with a brake pulley secured to the centrifugal shaft, a surrounding brake band whose fulcral portion is loosely supported to permit inward movement toward the brake against opposed spring resistance, a spring-actuated vertical revoluble spindle having link connection with the free ends of the brake band to contract the brake band upon the pulley, means for unsetting the brake and at the same time increasing the tension of said spring, and releasable means for holding the brake at inactive position against the tension of its actuating spring.

2. A brake for a gyratory suspended centrifugal embracing in combination with a brake pulley that is secured to the centrifugal, a vertical brake-supporting member, a brake band having its free ends pivotally connected with actuating links, a vertical brake-actuating rotatable spindle to which the adjacent ends of the links are attached, the fulcral portion of said brake being vertically slotted to loosely receive and be sustained by a vertical supporting member, and means exerting a yielding thrust between said vertical supporting member and the fulcral portion of the brake tending normally to move the fulcral portion of the brake outwardly from the pulley, while allowing inward movement toward the pulley when the brake is contracted by the spindle into frictional engagement with the pulley.

3. A brake for a gyratory suspended centrifugal embracing in combination with a brake pulley secured to the vertical gyratory centrifugal shaft, a surrounding brake band loosely mounted on a three-point suspension, means for contracting the brake band into frictional engagement with the pulley while allowing the brake band as a whole to accommodate itself to the gyratory movements of the pulley.

4. A brake for a gyratory suspended centrifugal embracing in combination a brake band adapted to partly surround an internally disposed brake pulley, a revoluble vertical spindle flexibly connected with the adjacent free ends of the brake band to contract the brake band upon the pulley when the spindle is rotated in one direction, a torsion spring surrounding said spindle to cause brake contracting rotation of the spindle when the spindle is released, means for varying the tension of said torsion spring, and means for returning the brake spindle to brake opening position and for retaining it in such position until released.

5. A brake for a gyratory suspended centrifugal embracing an annular band loosely fulcrumed at its middle portion to permit in and out and tilting movement, pivotal brake contracting and expanding links attached respectively to the free ends of the brake and having their adjacent ends connected with a vertical spring actuated spindle, and a spring arranged to normally move the fulcral part of the brake outward away from an internal pulley while permitting that portion of the brake to move inward when the free ends are contracted to brake setting position.

6. A brake for a centrifugal embracing in its construction an annular brake band adapted to partly encircle an internally disposed brake pulley, the middle fulcral portion of said band being provided with a supporting member that is slotted to loosely receive and be supported by a member depending from the centrifugal hanger, a thrust spring mounted in the fulcral member of the brake band to yieldingly exert an outward thrust thereon, and brake actuating links connected with the free ends of the brake band and also connected with a brake actuating spindle.

7. A brake band for a brake of the class described, embracing in its construction a radially slotted fulcral member secured to the middle portion of the band, arcuate brake pads secured to the inside of the brake band on opposite sides of an internally disposed brake pulley, receptacles secured to the outside of the brake band opposite the forward end portion of each brake pad, said band being provided with an internal distributing groove subtending each brake pad, said groove having communication at its forward end with said receptacle to provide for the distribution of dressing carried by the receptacle.

8. A brake for a suspended centrifugal embracing in combination with a pulley secured to the rotary centrifugal shaft, a horizontal brake band having a fulcral member intermediate of its ends loosely mounted on a fixed post depending from the centrifugal hanger, a spring interposed between the outer face of said post and said fulcral member to normally thrust the fulcrum away from the brake pulley band, actuating links secured to the free ends of said band and connected with a rotatable vertical spindle, a torsion spring secured to said spindle to normally contract the brake band against the pulley, and manually controlled means for expanding and locking said brake band in expanded position.

9. A brake mechanism for a gyratory suspended centrifugal embracing a brake pulley, an external brake band encircling said pulley in a plane below the suspension center of the centrifugal, said brake band being supported intermediate of its ends on a radially movable fulcrum normally pressed outward away from the brake pulley, and band expanding and contracting links pivotally connected to the free ends of the band and having their other ends pivotally connected with a brake actuating spindle.

In witness whereof, I have subscribed the above specification.

EUGENE ROBERTS.